United States Patent
Takifuji et al.

(10) Patent No.: US 9,323,204 B2
(45) Date of Patent: Apr. 26, 2016

(54) BELT UNIT AND IMAGE FORMING APPARATUS

(71) Applicants: Kotaro Takifuji, Nagoya (JP); Hiroshi Nakano, Nagoya (JP); Wataru Yamaguchi, Nisshin (JP)

(72) Inventors: Kotaro Takifuji, Nagoya (JP); Hiroshi Nakano, Nagoya (JP); Wataru Yamaguchi, Nisshin (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 244 days.

(21) Appl. No.: 13/845,540

(22) Filed: Mar. 18, 2013

(65) Prior Publication Data

US 2013/0343794 A1 Dec. 26, 2013

(30) Foreign Application Priority Data

Jun. 22, 2012 (JP) ................................. 2012-141077

(51) Int. Cl.

| | |
|---|---|
| G03G 15/00 | (2006.01) |
| B65G 15/60 | (2006.01) |
| B65H 5/02 | (2006.01) |
| G03G 15/16 | (2006.01) |
| B65G 15/64 | (2006.01) |

(52) U.S. Cl.
CPC ............ *G03G 15/6529* (2013.01); *B65G 15/60* (2013.01); *B65H 5/021* (2013.01); *G03G 15/1615* (2013.01); *B65G 15/64* (2013.01); *B65H 2404/2222* (2013.01); *B65H 2404/251* (2013.01); *B65H 2404/252* (2013.01); *B65H 2801/06* (2013.01); *G03G 2215/00143* (2013.01)

(58) Field of Classification Search
CPC .................. B65G 15/64; B65G 15/60; G03G 2215/00143; G03G 2214/00151; B65H 5/021; B65H 11/005; B65H 2301/44322; B65H 2404/211

USPC .................................................. 399/388, 303
See application file for complete search history.

(56) References Cited

U.S. PATENT DOCUMENTS

| | | | |
|---|---|---|---|
| 6,505,026 B2 * | 1/2003 | Hayakawa et al. ........... | 399/303 |
| 2003/0091373 A1 | 5/2003 | Abe et al. | |
| 2004/0076455 A1 * | 4/2004 | Fujiwara ....................... | 399/303 |

(Continued)

FOREIGN PATENT DOCUMENTS

| | | |
|---|---|---|
| JP | 11-079458 A | 3/1999 |
| JP | 2002-082531 A | 3/2002 |

(Continued)

OTHER PUBLICATIONS

Mar. 8, 2016—(JP) Notification of Reasons for Rejection—App 2012-141077, Eng Tran.

*Primary Examiner* — Matthew G Marini
*Assistant Examiner* — John M Royston
(74) *Attorney, Agent, or Firm* — Banner & Witcoff, Ltd.

(57) ABSTRACT

A belt unit, including an endless belt, a first roller, a second roller, and a guiding member, is provided. The endless belt includes a belt strip and a guided section protruding from an inner circumferential surface of the belt strip. The guiding member with a groove is arranged on one of axial-end sides of the first roller coaxially with the first roller. The guided section of the endless belt is set in the groove. The groove includes a first face and a second face facing each other along a direction in parallel with a central axis of the first roller. The guiding member includes a first piece containing the first face and a second piece containing the second face. The first face protrudes outwardly with respect to the inner circumferential surface of the belt strip.

16 Claims, 8 Drawing Sheets

(56) References Cited

U.S. PATENT DOCUMENTS

| | | | |
|---|---|---|---|
| 2006/0159489 A1* | 7/2006 | Ishii et al. | 399/165 |
| 2009/0238614 A1* | 9/2009 | Kakyo | 399/302 |
| 2009/0294256 A1* | 12/2009 | Okamoto et al. | 198/806 |

FOREIGN PATENT DOCUMENTS

| | | |
|---|---|---|
| JP | 2003-149951 A | 5/2003 |
| JP | 2008-170478 A | 7/2008 |
| JP | 2009-008917 A | 1/2009 |

* cited by examiner

BELT UNIT AND IMAGE FORMING APPARATUS

CROSS REFERENCE TO RELATED APPLICATION

This application claims priority from Japanese Patent Application No. 2012-141077, filed on Jun. 22, 2012, the entire subject matter of which is incorporated herein by reference.

BACKGROUND

1. Technical Field

An aspect of the present invention relates to a belt unit including an endless belt and an image forming apparatus with the belt unit.

2. Related Art

A belt unit, in which a strained endless belt strip rolls around a pair of roller, has often been used in, for example, an image forming apparatus. The belt unit may include the belt strip being an endless belt and a guided part, which is arranged at one of widthwise ends of the belt strip to protrude inward from the belt strip. The guided part may be engaged with a groove formed in a rotatable guiding member, which is arranged at one of axial ends along an axial direction of each roller. With the guided part guided in the groove, the endless belt may be prevented from drifting in the axial direction of the rollers.

While an image forming apparatus may be equipped with the belt unit with the endless belt, if the endless belt unsteadily drifts in the axial direction, quality of an image formed in the image forming apparatus may be lowered.

SUMMARY

The guiding member with the groove may be often made by, in view of reduction of manufacturing cost, molding. In molding, however, a molded item may have a linear burr or tier called a parting line at a position corresponding to edges of divided faces of the molds.

Generally, in molding, a filler material such as resin is filled in a hollow space formed by two or more pieces of mold pattern, and the mold patterns are separated apart to unmold the solidified resin piece. Therefore, when the guiding member with the groove is unmolded, the mold patterns may be moved along an unmolding direction, which is along a lengthwise direction of the groove, and in other words, the mold patterns may be removed along a direction orthogonal to a central axis of the rotatable guiding member.

The divided faces of the mold patterns may lie orthogonally to the unmolding direction. Meanwhile, lateral sides of the groove in the guiding member may be formed in shapes of a disk. Therefore, a parting line in the lateral sides of the guiding member may be formed along the direction orthogonal to the central axis and the unmolding direction. In other words, the parting line in the lateral sides may lie along a radial direction of the disk.

When the guiding member is mold-clamped, on the other hand, the mold patterns may be moved and assembled to be closer to one another to form the hollow space therein. However, due to a positioning error in a mold-clamping apparatus, the mold patterns may not be assembled to the correct positions with respect to each other, and a parting line lying may be formed in the groove of the guiding member.

When the parting line is formed along the radial direction in the groove, the widthwise end of the endless belt may collide with the parting line regularly while the guiding member rotates, and the endless belt may be damaged by the collision.

The present invention is advantageous in that a belt unit and an image forming apparatus, in which an endless belt can be prevented from being damaged by a parting line, are provided.

According to an aspect of the present invention, a belt unit is provided. The belt unit includes an endless belt comprising a belt strip and a guided section, the guided section protruding from an inner circumferential surface of the belt strip at one of widthwise sides along a widthwise direction of the belt strip; a first roller and a second roller, around which the endless belt is strained; and a guiding member arranged on one of axial-end sides of the first roller along an axial direction of the first roller coaxially with the first roller, the guiding member being formed to have a groove, in which the guided section is set. The groove includes a first face and a second face, which face each other along a direction in parallel with a central axis of the first roller, the first face being arranged in a position closer to the one of widthwise sides with respect to the second face along the direction in parallel with the central axis. The guiding member includes a first piece containing the first face and a second piece containing the second face, and the first face protrudes outwardly with respect to the inner circumferential surface of the belt strip.

According to another aspect of the present invention, an image forming apparatus, including an image forming unit configured to form an image on a sheet, and a belt unit, is provided. The belt unit includes an endless belt comprising a belt strip and a guided section, the guided section protruding from an inner circumferential surface of the belt strip at one of widthwise sides along a widthwise direction of the belt strip; a first roller and a second roller, around which the endless belt is strained; and a guiding member arranged on one of axial-end sides of the first roller along an axial direction of the first roller coaxially with the first roller, the guiding member being formed to have a groove, in which the guided section is set. The groove includes a first face and a second face, which face each other along a direction in parallel with a central axis of the first roller, the first face being arranged in a position closer to the one of widthwise sides with respect to the second face along the direction in parallel with the central axis. The guiding member includes a first piece containing the first face and a second piece containing the second face, and the first face protrudes outwardly with respect to the inner circumferential surface of the belt strip.

BRIEF DESCRIPTION OF THE ACCOMPANYING DRAWINGS

Figure 6:
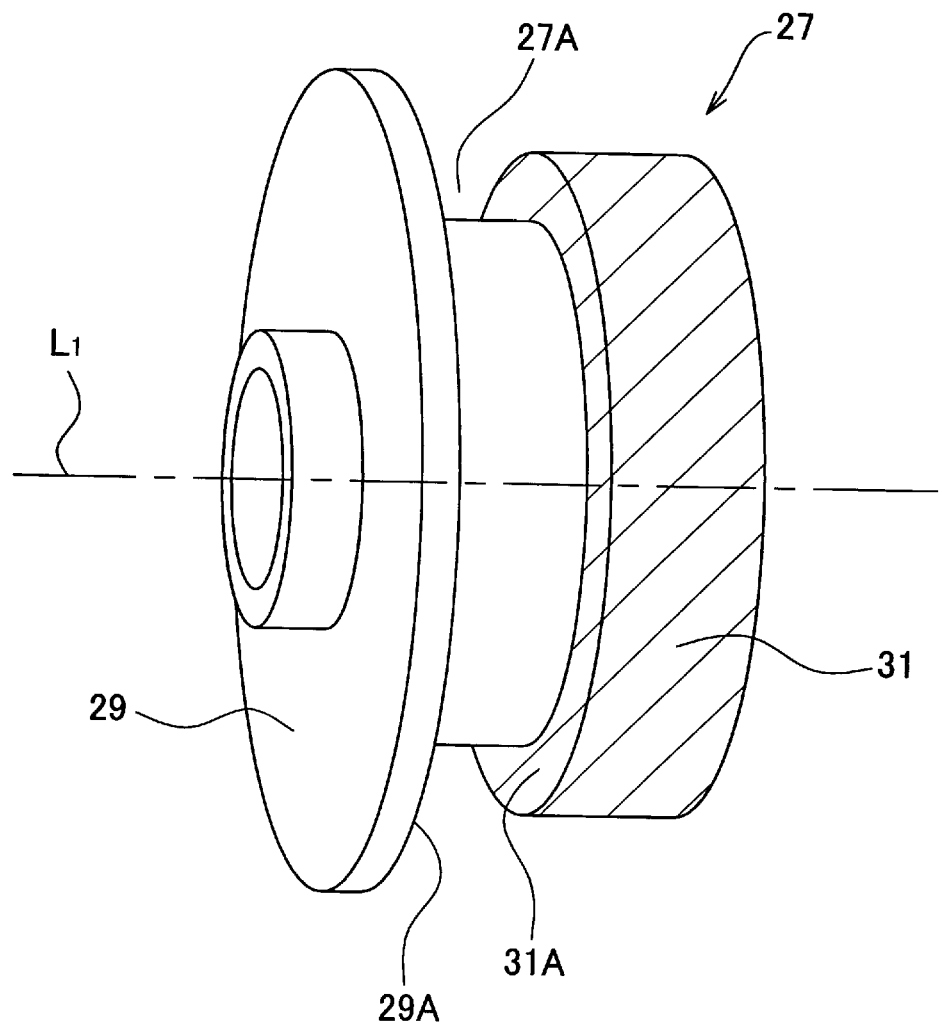

FIG. 6 is a perspective view of a guiding member 27 with a first piece 29 and a second piece 31 in the belt unit 20 according to the embodiment of the present invention.

Figure 7:
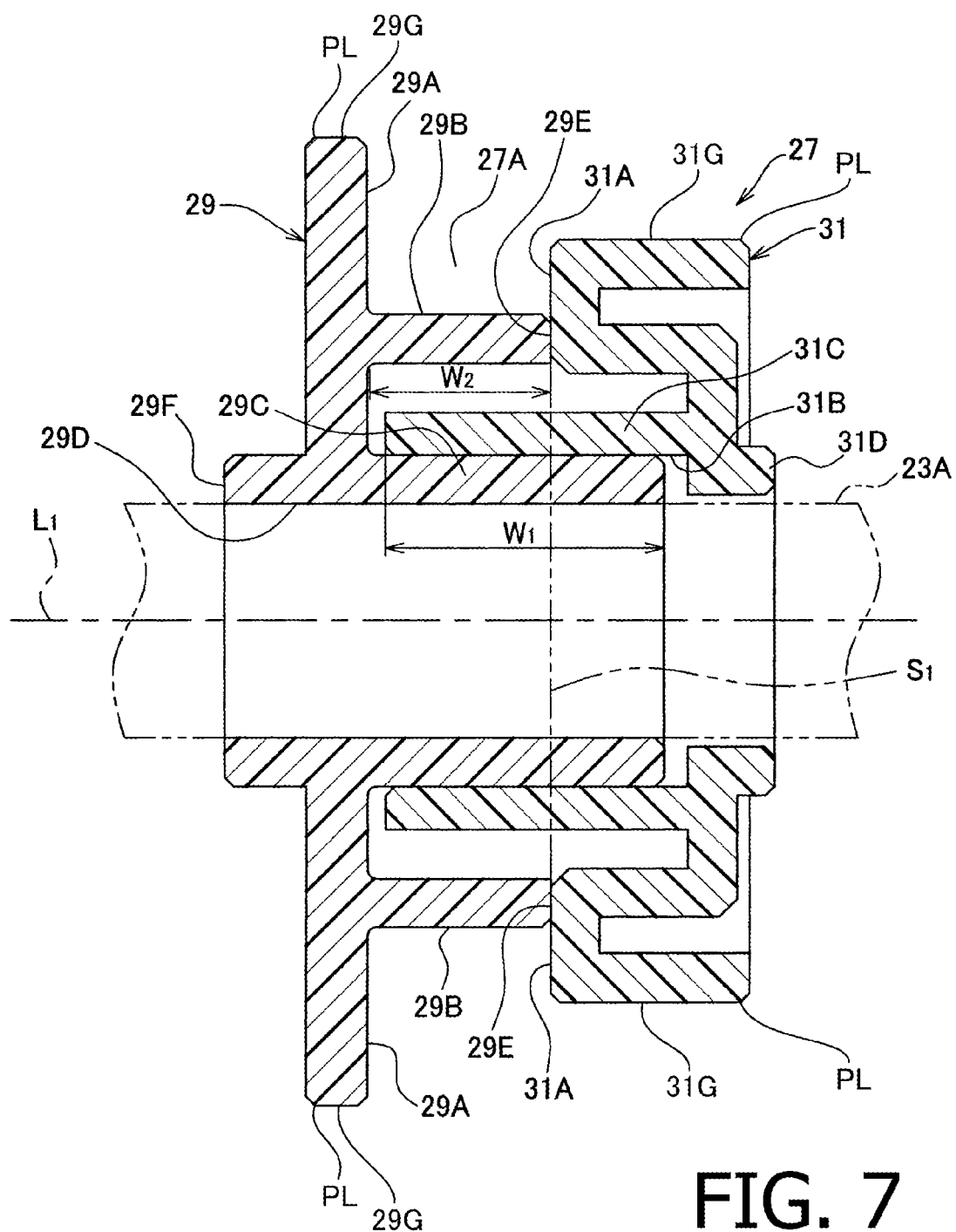

FIG. 7 is a cross-sectional view of the guiding member 27 in the belt unit 20 according to the embodiment of the present invention.

Figure 8:
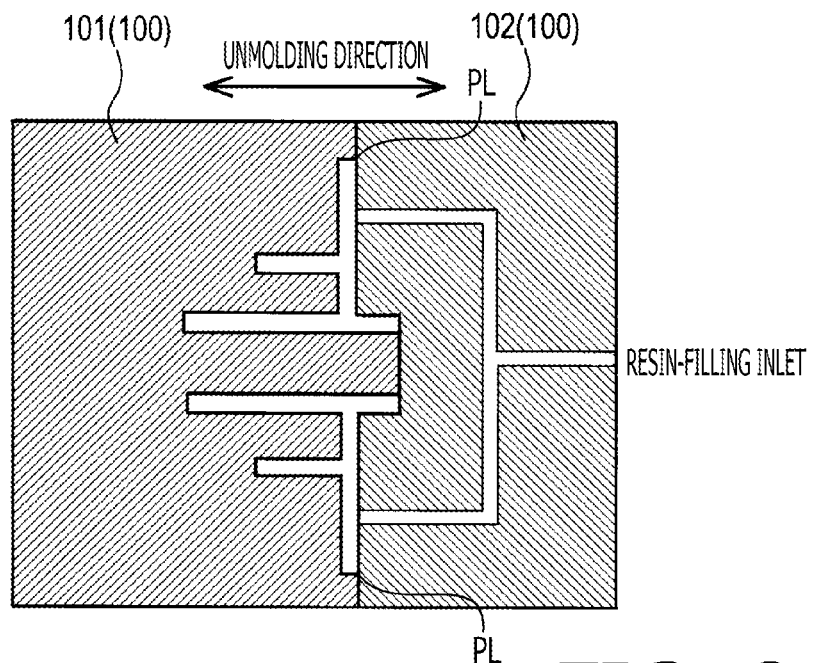

FIG. 8 is an illustrative view of mold patterns 100 for the belt unit 20 according to the embodiment of the present invention.

Figure 9:
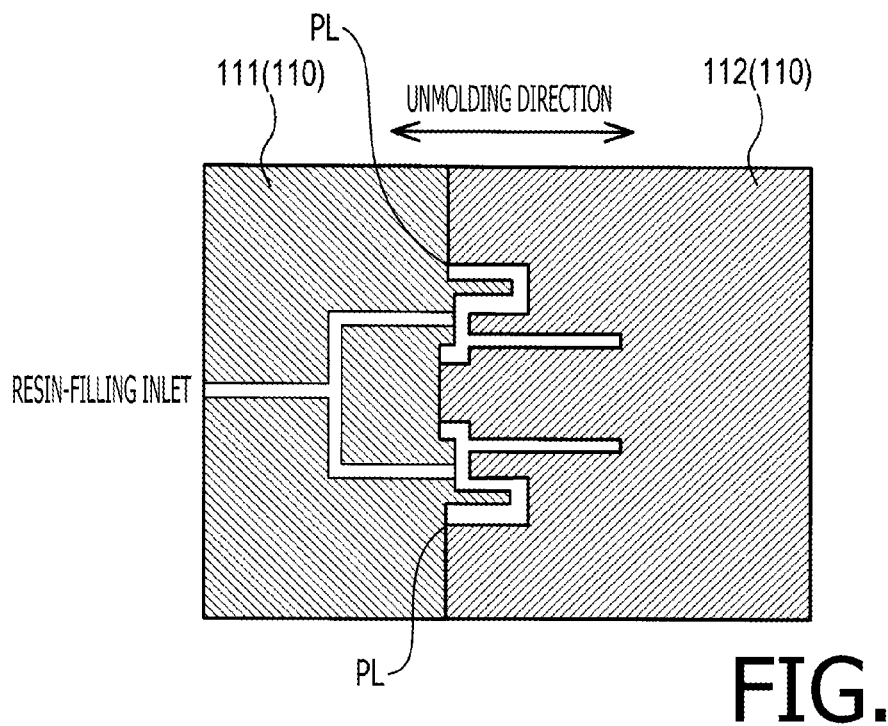

FIG. 9 is an illustrative view of mold patterns 110 for the belt unit 20 according to the embodiment of the present invention.

DETAILED DESCRIPTION

Hereinafter, an embodiment of the present invention will be described with reference to the accompanying drawings. It is noted that various connections are set forth between elements in the following description. These connections in general, and unless specified otherwise, may be direct or indirect, and this specification is not intended to be limiting in this respect.

1. Overall Configuration of Image Forming Apparatus

Figure 1:
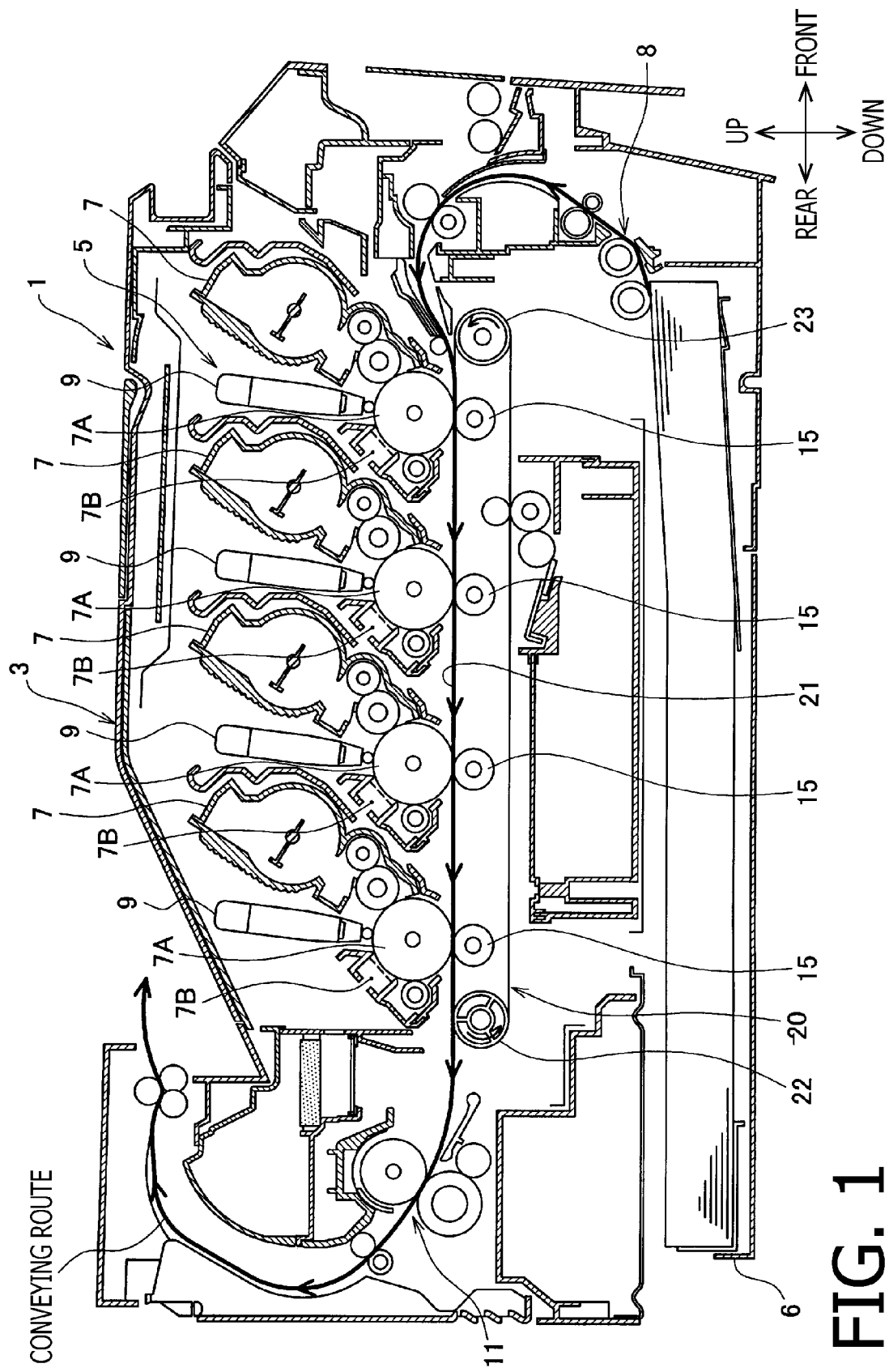
FIG. 1 is a cross-sectional side view of an image forming apparatus 1 according to an embodiment of the present invention.

An overall configuration of an image forming apparatus 1 according to the embodiment will be described with reference to FIG. 1. The image forming apparatus 1 being a multicolor electro-photographic image forming apparatus includes a chassis 3, which accommodates an image forming unit 5 inside. The image forming unit 5 is configured to transfer an image on a sheet (unsigned) of recording paper in an electro-photographic method. The image forming unit 5 includes a processing unit 7, an exposure unit 9, and a fixing unit 11.

The image forming apparatus 5 is a direct tandem-typed image forming unit, in which a plurality of (e.g., four) processing units 7 align along a sheet conveying route.

Each of the processing units 7 contains a developer agent therein, and colors of the developer agents are different from one another. Other than the colors of the contained developer agents, the processing units 7 are configured identically to one another. Each processing unit 7 includes a photosensitive drum 7A, on which an image in the developer agent is formed, and a charger 7B to electrically charge the photosensitive drum 7A.

In a position opposite from the photosensitive drums 7A, across an upper part of a transfer belt 21, a transfer unit 15 to transfer the developer agents carried on the photosensitive drums 7A to the sheet is disposed. The developer agents carried on the photosensitive drums 7A are transferred to the sheet while the sheet is conveyed on the transfer belt 21 and heated by the fixing unit 11 to be fixed on the sheet.

A feeder tray 6 is disposed in a lower position with respect to a belt unit 20. The feeder tray 6 accommodates stacked sheets therein, and the sheets are picked up and conveyed one-by-one toward the image forming unit 5 by a feeder unit 8. The feeder tray 6 is removable from the image forming apparatus 1.

2. Belt Unit 2.1 Configuration of the Belt Unit

Figure 2:
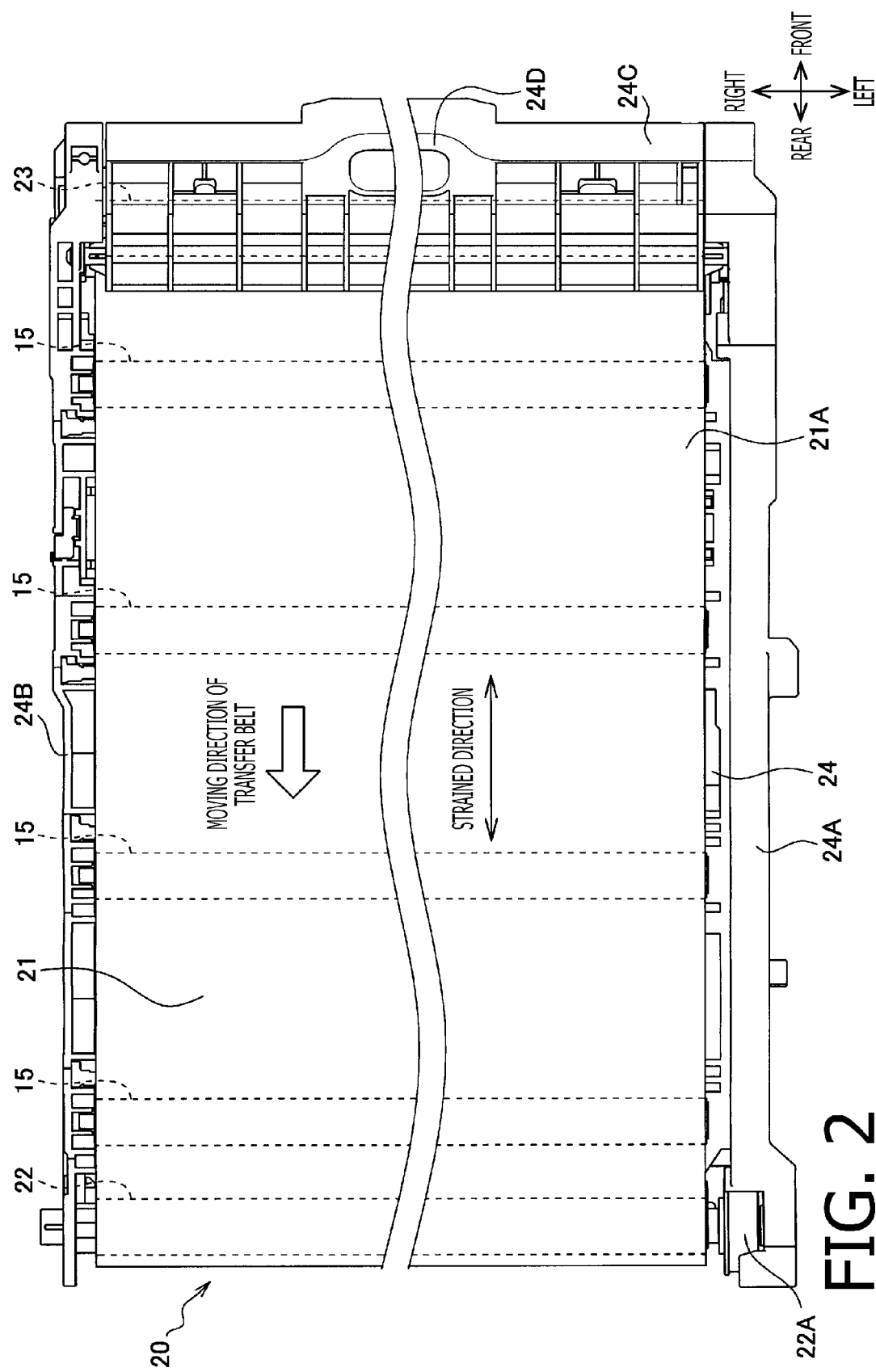
FIG. 2 is a top plan view of a belt unit 20 of the image forming apparatus 1 according to the embodiment of the present invention.

As shown in FIG. 2, the belt unit 20 includes the transfer belt 21, a driving roller 22, a driven roller 23, and a frame assembly 24 to hold the driving roller 22 and the driven roller 23.

The transfer belt 21 is an endless belt arranged in a strained condition to roll around the driving roller 22 and the driven roller 23 along with rotation of the driving roller 22 and the driven roller 23. The driving roller 22 is a roller to circulate the transfer belt 21, and the driven roller 23 is rotated by the driving roller 22 along with the circulation of the transfer belt 21. The endless belt denotes a belt which has no end along a rolling direction and can be circulated around the rollers endlessly.

The frame assembly 24 includes lateral frames 24A, 24B, which are arranged on axial-end (left and right) sides along an axial direction of the driving roller 22 to extend in parallel with a strained direction of the transfer belt 21. The strained direction denotes a direction of tensile force, which is produced in a strained surface 21A of the transfer belt 21 when the transfer belt 21 is installed in the frame assembly 24. The strained surface 21A denotes a surface of the transfer belt 21 which faces the photosensitive drums 7A when the belt unit 20 is installed in the image forming apparatus 1. In the present embodiment, the axial direction coincides with a widthwise (right-left) direction of the image forming apparatus 1 and includes a direction of an axis of the driving roller 22 and a direction of an axis of the driven roller 23. Meanwhile, an axial-end side along the axial direction denotes an area closer to an axial end of the driving roller 22 or the driven roller 23 with respect to a widthwise center of image forming apparatus 1 along the axial direction. In the following description, one of the axial-end sides denotes a left-hand side along the axial direction with respect to the widthwise center, and the other of the axial-end sides denotes a right-hand side along the axial direction with respect to the widthwise center.

Figure 3:
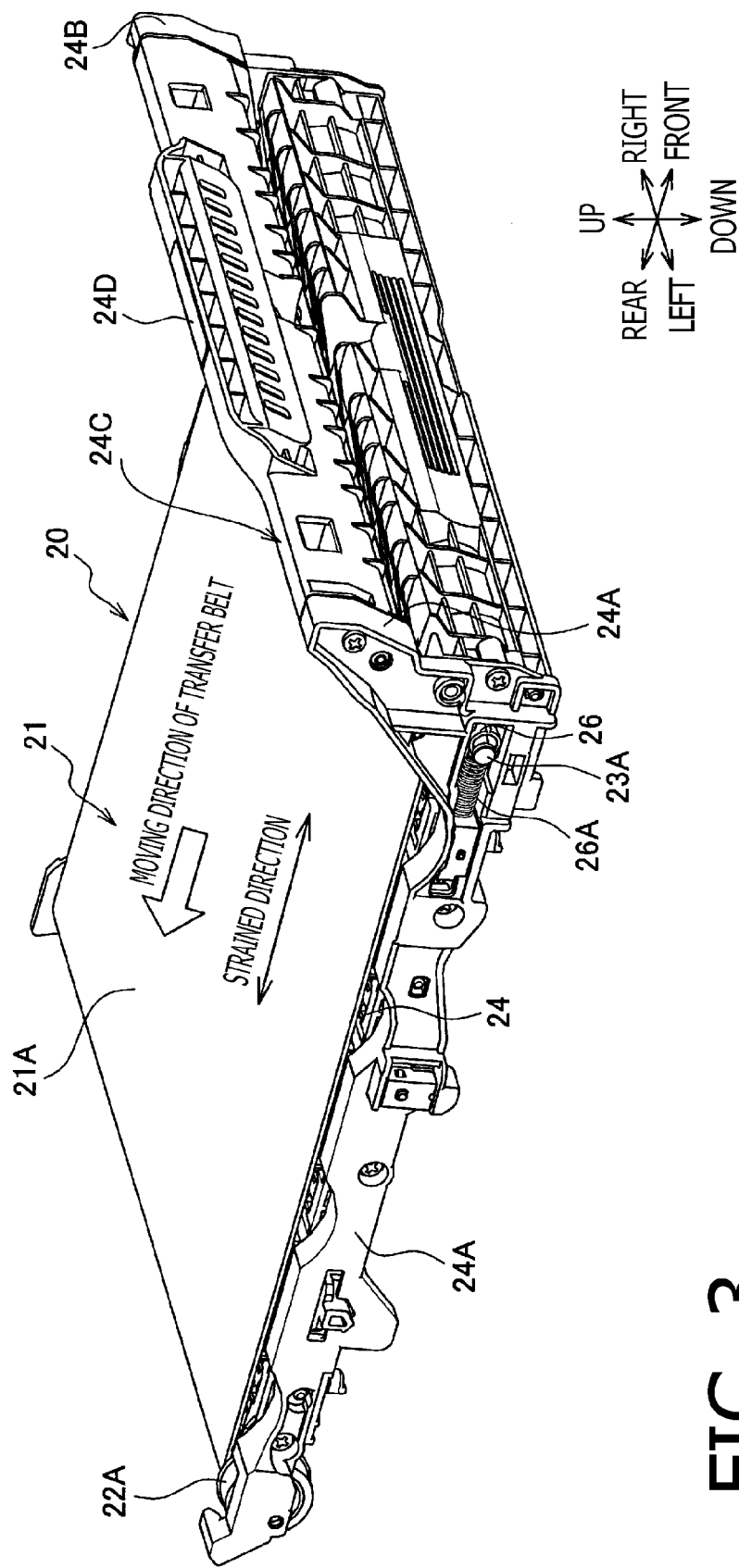
FIG. 3 is a perspective view of the belt unit 20 in the image forming apparatus 1 according to the embodiment of the present invention.

As shown in FIG. 3, the lateral frames 24A, 24B are fixed in the frame assembly 24 by a fastening means such as screws (unsigned). On one of longitudinal ends of the lateral frame 24A closer to the driven roller 23 and on one of longitudinal ends of the lateral frame 24B closer to the driven roller 23, a gripper frame 24C extending along the axial direction to bridge between the lateral frames 24A, 24B is attached.

The gripper frame 24C includes a gripper 24D, by which the belt unit 20 is gripped, while the belt unit 20 is detachably attached to a main frame (not shown) in the chassis 3 of the image forming apparatus 1. A user of the image forming apparatus 1 may grip onto the gripper 24D when the user attaches and removes the belt unit 20 to and from the image forming apparatus 1.

The main frame of the image forming apparatus 1 includes a paired frames, which are arranged on both axial (right and left) sides of the chassis 3 along the axial direction. Therefore, the belt unit 20 is installed in the image forming apparatus 1 to bridge between the paired main frame on the right and left sides along the axial direction. In the following description, unless otherwise noted, "the main frame" denotes one of the paired main frames closer to the lateral frame 24A.

The driving roller 22 is rotatably held by the lateral frames 24A, 24B at axial ends thereof in a fixed position with respect to the lateral frames 24A, 24B. A roller gear 22A (see FIG. 2), which rotates along with the driving roller 22, is arranged on one of the axial-end sides of the driving roller 22 along the direction.

Meanwhile, on the main frame, a driving gear (not shown) is arranged. The driving gear is engaged with the roller gear 22A and supplies driving force to the driving roller 22. The driving gear is rotated by rotating force supplied from an electric motor (not shown).

The driven roller 23 is rotatably held by the lateral frames 24A, 24B at axial ends thereof and is movable in the strained direction. In other words, as shown in FIG. 3, shafts 24A of the driven roller 23 are rotatably held in shaft supports 26 at the axial ends thereof. The shaft supports 26 are attached to the lateral frames 24A, 24B and movable in the strained direction.

On each of the lateral frames 24A, 24B, a resilient member 26A such as a coil spring is arranged. The resilient member 26A provides resilient force, which is in a direction from the driving roller 22 toward the driven roller 23, and applies the resilient force to the shaft support 26. Thus, the driven roller 23 generates predetermined intension of tensile force in the strained surface 21A.

Figure 4:
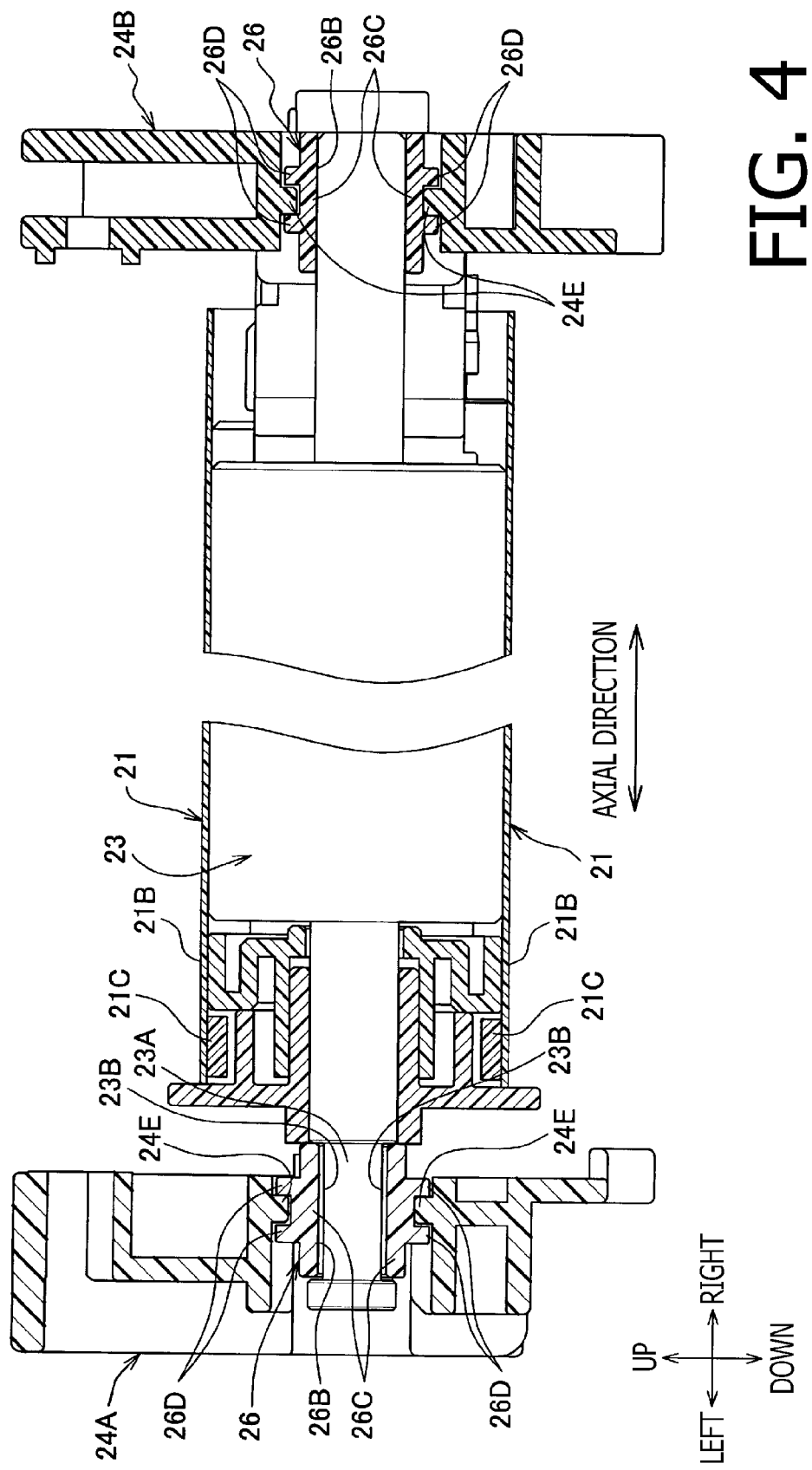
FIG. 4 is a cross-sectional view of a structure including a driven roller 23 in the belt unit 20 according to the embodiment of the present invention.

The shaft support 26 includes, as shown in FIG. 4, a tubular section 26C, in which a shaft hole 26B is formed, and a positioning section 26D, which is formed on an outer circumference of the tubular section 26C. The positioning section 26D is formed to have protrusions, and in between the protrusions along the axial direction, a rail 24E is interposed.

The rail 24E is formed in each of the lateral frames 24A, 24B. The rail 24E is a linearly formed protrusion extending along the strained direction, and the positioning section 26D having the paired protrusions is in slidably contact with lateral faces of the rail 24E. The lateral faces of the rail 24E refer to surfaces which are orthogonal to the axial direction. With the rail 24E slidably interposed in between the protrusions of the positioning section 26D, the shaft support 26 is placed in a correct position in the axial direction with respect to the lateral frames 24A, 24B.

The driven roller 23 is formed to be smaller in a diameter at a dent 23B, which dents inward along an entire outer circumference of the driven roller 23. The dent 23B is formed in a shaft of the driven roller 23 on one of the axial-end sides with the lateral frame 24A (e.g., the left-hand side). The dent 23B is slidably in contact with an inner circumference of the tubular section 26C in the shaft hole 26B.

The dent 23B is an inwardly-dented groove, which is formed to have a cross-sectional shape of a three-sided concave having lateral faces 23C at both sides along the axial direction and a bottom surface 23D on a level closer to a central axis L1. While the inner circumference of the tubular section 26C is in slidably contact with the bottom surface 23D, the shaft 23A is rotatably supported by the shaft support 26.

While an end 26E of the tubular section 26C along the axial direction is in slidably contact with the lateral face 23C of the dent 23B, the shaft 23A is placed in a correct position in the axial direction with respect to the shaft support 26. In other words, the dent 23B defines a correct position of the driven roller 23 in the axial direction with respect to the shaft support 26.

Further, the position of the shaft support 26 with respect to the lateral frame 24A along the axial direction is defined by the positioning section 26D. Thus, the dent 23B serves to place the driven roller 23 in the correct position in the axial direction with respect to the lateral frame 24A. In other words, the position of the driven roller 23 in the axial direction is defined with reference to the lateral frame 24A.

Meanwhile, the transfer belt 21 includes a guided part 21C, which protrudes inwardly from a belt strip 21B, in a position corresponding to one of axial-end sides (e.g., a left-hand side) of the belt strip 21B. More specifically, the guided part 21C is a linearly-formed protrusion extending in the strained direction at a widthwise end (e.g., a leftward) position along an inner circumferential surface of the belt strip 21B.

In this regard, the inner circumferential surface of the belt strip 21B refers to a surface, which contacts the driven roller 23. On the other hand, an outer circumferential surface of the belt strip 21B refers to an opposite side of the belt strip 21B from the inner peripheral surface.

The belt strip 21B in the present embodiment is made of a resin in a polyamide series, while the guided section 21C is made of a resin in an urethane series. The belt strip 21B and the guided section 21C are attached to each other by an adhesive agent in a modified silicone series.

In the belt unit 20, a guiding member 27 is arranged on the one of axial-end sides (e.g., a left hand side) of the driven roller 23 along the axial direction. The guiding member 27 is formed to have a groove 27A, which is depressed toward the central axis L1. With the guided section 21C of the transfer belt 21 set in the groove 27A, the transfer belt 21 is restricted from moving in the axial direction.

Meanwhile, as shown in FIG. 4, the belt strip 21B does not have a guided section 21C in a position corresponding to the other one of axial-end sides (e.g., the right hand side) thereof. In other words, there is no guided section 21C on the other side of the belt strip 21B along the widthwise direction, but the guided piece 21C is arranged solely in the position on the one of the widthwise sides (e.g., the left hand side). Therefore, there is no guiding member 27 on the other one of axial-end sides of the driven roller 23.

More specifically, the guided section 21C is arranged in a displaced position with respect to the one of the widthwise ends (e.g., the left side end) of the belt strip 21B toward the other one of the widthwise ends (e.g., rightward). Accordingly, the belt strip 21B has a jut 21D (see FIG. 5), which protrudes leftward with respect to the guided piece 21C, on the left hand side along the widthwise direction.

2.2 Structure of the Guiding Member

The groove 27A in the guiding member 27 is formed in a circular shape to circle about the central axis L1 (see FIG. 6). In particular, the groove 27A has a cross-sectional shape of three-sided concave groove having a first face 29A, a second face 31A, and a bottom surface 29B (see FIG. 7).

The first face 29A and the second face 31A are in positions to face each other along a direction in parallel with the central axis L1 and form annular planes expanding in parallel with each other. The bottom surface 29B extends in parallel with the central axis L1 and forms an annular surface which connects one end of the first face 29A closer to the central axis L1 and one end of the second face 31A closer to the central axis L1. The first face 29A refers to a surface on an outer side closer to the one of widthwise ends with respect to the second face 31A along the direction in parallel with the central axis L1, i.e., the widthwise direction.

Figure 5:
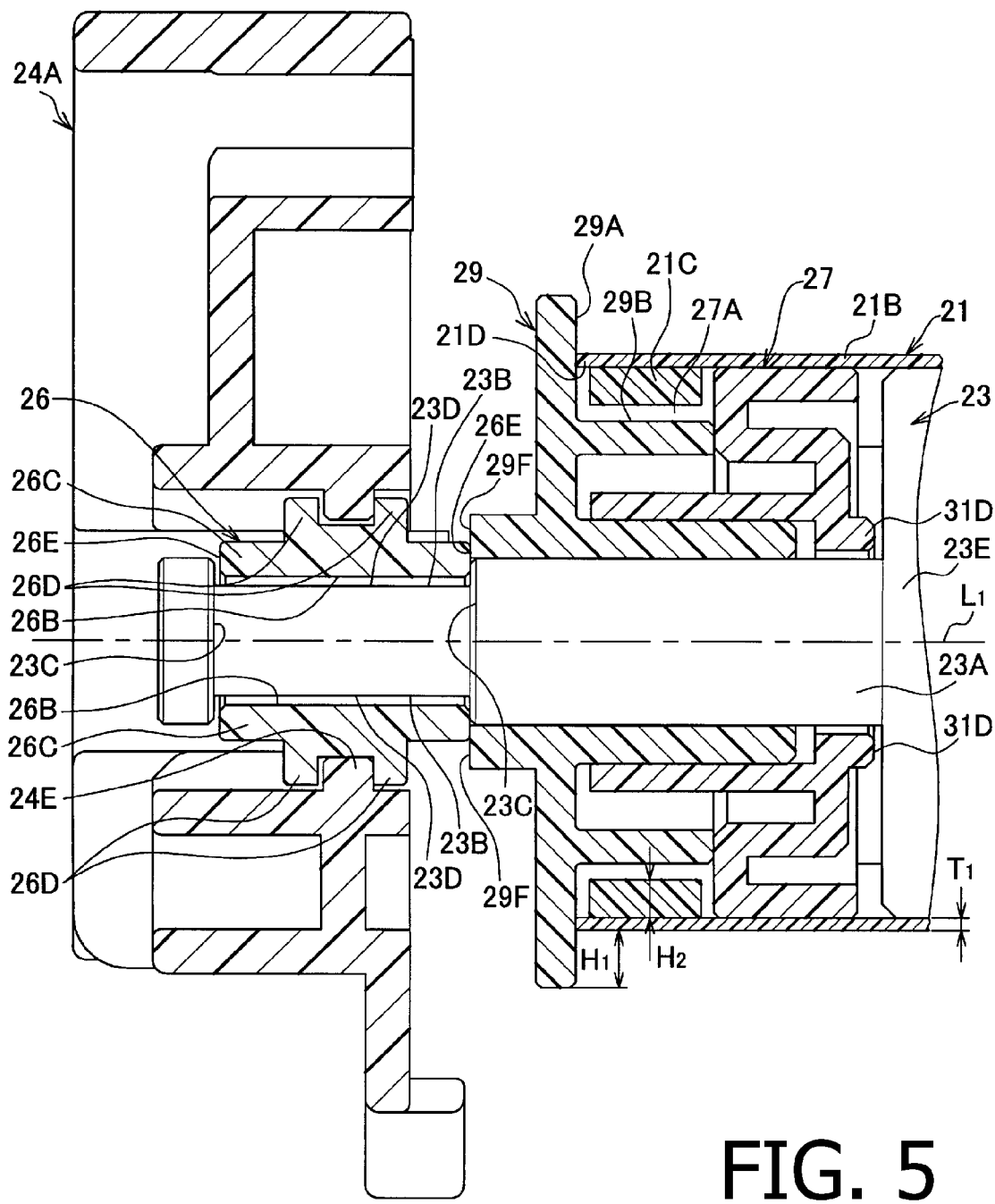
FIG. 5 is a cross-sectional view of an axial end area of the driven roller 23 in the belt unit 20 according to the embodiment of the present invention.

As shown in FIG. 5, the first face 29A protrudes toward an outer side with respect to the inner circumferential surface of the belt strip 21B and extends outwardly beyond the outer circumferential surface of the belt strip 21B. A height H1 of the protrusion of the first face 29A is greater than or equal to a sum of a thickness T1 of the belt strip 21B and a height H2 of the guided section 21C.

The guiding member 27 includes, as shown in FIG. 7, a first piece 29 having the first face 29A and a second piece 31 having the second face 31A. The first piece 29 is a molded resin piece formed integrally with the first face 29A, the bottom surface 29B, and a press-fit part 29C. The second piece 31 is a molded resin piece formed integrally with the second face 31A and an engaging part 31C.

In the present embodiment, the first piece 29 and the second piece 31 are mutually press-fitted to be assembled together. In particular, the engaging part 31C of the second piece 31 is formed in a tubular shape with a press-fit hole 31B. On the other hand, the first piece 29 is formed to have the press-fit part 29C, which is in a tubular shape. An inner diameter of the press-fit hole 31B is substantially equal to or slightly smaller than an outer diameter of the press-fit part 29C.

The first piece 29 is press-fixed to the second piece 31 by the press-fit part 29C being squeezed into the press-fit hole 31B along the direction in parallel with the central axis L1. When squeezed, the press-fit part 29C is inserted into the press-fit hole 31B until an edge 29E of the first piece 29 contacts the second piece 31. The edge 29E refers to a tip end of a part forming the bottom surface 29B and extending in parallel with the central axis L1 and is an open end along an extending direction of the bottom surface 29B.

While the press-fit part 29C and the press-fit hole 31D are engaged with each other, a length W1 of a part, in which the press-fit part 29C and the press-fit hole 31D contact each other, along the direction in parallel with the central axis L1 is greater than a width W2 of the groove 27A. In the present embodiment, in particular, the length W1 is approximately 1.5 times as long as the width W2.

In this regard, the width W2 refers to a maximum dimension within a distance between the first face 29A and the second face 31A. Meanwhile, in the present embodiment, the first face 29A and the second face 31A expand in parallel with each other. Therefore, the width W2 is equivalent to the distance between the first face 29A and the second face 31A. In other words, the width W2 is equal to the distance between the first face 29A and the edge 29E.

An inner circumference of the press-fit part 29C serves as a bearing 29D, by which the guiding member 27 is rotatably supported on the shaft 23A of the driven roller 23. In order to rotatably support the guiding member 27 on the shaft 23A, the bearing 29D is formed to extend along the direction in parallel with the central axis L1 from a side of the first face 29A toward a side of the second face 31A with an open end thereof extending beyond a virtual plane S1, which contains the second face 31A, to reach a position in the vicinity of the driven roller 23.

The bearing 29D is a slide bearing, which is slidably in contact with an outer circumference of the shaft 23A. Thus, the guiding member 27 is movable in the axial direction and rotatable about the central axis L1 independently from the driven roller 23.

In the first piece 29, a first restricting section 29F is formed in a position to face the shaft support 26. As shown in FIG. 5, the first restricting section 29F contacts the shaft support 26 when the guiding member 27 is moved to the shaft support 26 and restricts the guiding member 27 from being moved further beyond a predetermined dimension toward the one of the axial ends (e.g., the leftward end) of the driven roller 23. In the present embodiment, an edge of the bearing 29D at the side of the shaft support 26 serves as the first restricting section 29F.

Meanwhile, in the second piece 31, a second restricting section 31D is formed in a position to face the driven roller 23. The second restricting section 31D contacts a roller body 23E of the driven roller 23 when the guiding member 27 is moved to the roller body 23E and restricts the guiding member 27 from being moved further beyond toward the other one of the axial ends (e.g., the rightward end) of the driven roller 23.

The roller body 23E of the driven roller 23 refers to a cylindrical part, which contacts the belt strip 21B, in the driven roller 23. The second restricting section 31D in the present embodiment includes an annular projection, which is in a coaxial position with the bearing 29D.

Thus, the guiding member 27 is interposed in a position between the shaft support 26 and the roller body 23E of the driven roller 23 along the axial direction. When the first restricting section 29F contacts the cylinder 26C of the shaft support 26, a position of the one of axial ends (e.g., the leftward end) of the guiding member 27 is determined. Further, when the second restricting section 31D contacts the roller body 23E, a position of the other one of axial ends (e.g., the rightward end) of the guiding member 27 is determined.

Thus, the shaft support 26 is placed in a correct position with respect to the lateral frame 24A by the positioning section 26D. The driven roller 23 is placed in a correct position with respect to the lateral frame 24A indirectly by the dent 23B being placed in the correct position with respect to the shaft support 26. The guiding member 27, in particular, the groove 27A is placed in a correct position with respect to the lateral frame 24A indirectly by the guiding member 27 being placed in the correct position with respect to the shaft support 26 and the driven roller 23.

2.3 Molding of the First and the Second Pieces

The first and the second pieces 29, 31 are separately molded and assembled integrally by being press-fitted to each other. FIG. 8 is an illustrative view of a mold 100 to form the first piece 29 according to the embodiment of the present invention. FIG. 9 is an illustrative view of a mold 110 to form the second piece 31 according to the embodiment of the present invention.

The mold 100 includes two pieces of mold patterns 101, 102, which can be separated and are designed to be removed, when unmolding, along the direction in parallel with the central axis L1 of the guiding member 27. The mold 110, similarly to the mold 100, as shown in FIG. 9, includes two pieces of mold patterns 111, 112, which can be separated and are designed to be moved along the direction in parallel with the central axis L1 of the guiding member 27 when unmolding.

With the molds 100, 110, as shown in FIGS. 8 and 9, parting lines PL are formed in positions to coincide with ends of axially extending edges 29G, 31G of the first piece 29 and the second piece 31 respectively that are spaced from the first face 29A and the second face 31A, respectively, where the axially extending edges 29G and 31G are radially outmost portions of the first piece 29 and the second piece 31, respectively. In other words, no parting line PL is formed in the first face 29A or the second face 31A.

In the molds 100, 110, molding spaces, in which the resin (e.g., POM) to form the first and second pieces 29, 31 is filled, are formed in the mold patterns 101, 112. Further, an inlet and an outlet (not shown) for the resin are formed in the mold patterns 102, 111. In FIGS. 8 and 9, mold-clamping apparatuses, which clamps the molds 101, 102 and the molds 111, 112 together and separates from each other, are omitted.

3. Features of the Image Forming Apparatus with the Guiding Member

As has been described above, the guiding member 27 includes the first piece 29 with the first face 29A and the second piece 31 with the second face 31A. Therefore, as shown in FIGS. 8 and 9, the molds 100, 110 can be designed to be removed in the unmolding direction, which is in parallel with the central axis L1.

Therefore, the parting lines PL are formed on the ends of the edges 29G, 31G of the unmolded first piece 29 and the second piece 31 that are spaced from first face 29A and second face 31A, respectively, where the axially extending edges 29G and 31G are radially outmost portions of the first piece 29 and the second piece 31, respectively. Accordingly, the first face 29A, which contacts the transfer belt 21, is prevented from being formed to have the parting line PL. Thus, the transfer belt 21 is prevented from being damaged by the parting line PL in an earlier stage.

Further, in the present embodiment, the first piece 29 and the second piece 31 are assembled integrally to form the guiding member 27. Therefore, the first and the second pieces 29, 31 can be rotated in a same angle rate.

Accordingly, undesired force, which can be caused by a difference between an angle rate of the first piece 29 and an angle rate of the second piece 31, is prevented from being applied to the transfer belt 21. Therefore, the transfer belt 21 can be smoothly and steadily circulated around the driven roller 23.

On the other hand, if the first piece 29 and the second piece 31 were formed to have bearings independently from each other, it is often the case that rotational resistance generated in the bearing in the first piece 29 differs from rotational resistance generated in the bearing in the second piece 31. If the rotational resistances are largely different from each other, the guiding member may not be rotated smoothly.

In this regard, according to the present embodiment, the first piece 29 has the bearing 29D, which holds the guiding member 27 rotatably, while the bearing 29D is not formed in the second piece 31. Therefore, the deficiency, which may be caused by the bearings formed over the first and the second pieces 29, 31, is prevented in principle, and the guiding piece 27 can be rotated smoothly.

When the transfer belt 21 drifts toward the first face 29A, one of the widthwise ends (e.g., the left side end) of the belt strip 21B is urged against the first face 29A. Therefore, the transfer belt 21 is restricted from drifting further, but the first piece 29 is pressed by the transfer belt 21 in a drifting direction of the transfer belt 21.

When the transfer belt 21 drifts toward the second face 31A, similarly, the other one of the widthwise ends (e.g., the right side end) of the belt strip 21B is urged against the second face 31A. Therefore, the transfer belt 21 is restricted from drifting further, but the second piece 31 is pressed by the transfer belt 21 in a drifting direction of the transfer belt 21.

Meanwhile, the guided section 21 C protrudes inwardly from the inner circumferential surface of the belt strip 21B. Accordingly, a position of a first contact portion in the belt strip 21B, which contacts the first face 29A when the belt strip 21B drifts leftward, is farther apart from the central axis L1 than a position of a second contact portion in the guided section 21C, which contacts the second face 31A when the belt 21 drifts rightward.

In this regard, a moment to affect the first piece 29 when the transfer belt 21 drifts leftward to contact the first face 29A is greater than a moment to affect the second piece 31 when the transfer belt 21 drifts rightward to contact the second face 31. Therefore, the first piece 29 being affected by the greater moment may incline outward more largely than the second piece 31 when the transfer belt 21 drifts.

Even if inclination of the first piece 29 and inclination of the second piece 31 are at an equivalent angle, because the first contact portion is farther apart from the central axis L1 than the second contact portion, the first contact portion is displaced along the drifting direction more largely than the second contact portion by the drifting transfer belt 21. Accordingly when the first piece 29 inclines largely, or the first contact portion is displaced largely, the transfer belt 21 tends to drift even for a greater amount.

In the meantime, according to the present embodiment, the bearing 29D is formed in the first piece 29. In other words, the first piece 29 is directly fixed to the bearing 29D, while the second piece 31 is indirectly fixed to the bearing 29D via the first piece 29.

Therefore, while the first piece 29, which tends to incline relatively largely compared to the second piece 31, is directly supported by the bearing 29D on the shaft 23A, the first piece 29 can be restricted from being inclined largely. Thus, the transfer belt 21 can be prevented from drifting for a large amount.

In the present embodiment, the bearing 29D is formed in the tubular shape, and one of the axial ends (e.g., the rightward end) of the tube extends beyond the virtual plane Si containing the second face 31A to reach the position in the vicinity of the driven roller 23. Thus, with the extended bearing 29D, the guide member 27 can be supported securely in position.

In the present embodiment, the first piece 29 and the second piece 31 are press-fitted along the direction in parallel with the central axis L1 to be assembled integrally. Further, the length W1 of the part, in which the press-fit part 29C and the press-fit hole 31D contact each other, along the direction in parallel with the central axis L1 is greater than or equal to the width W2 of the groove 27A. Thus, a substantial length for the press-fitted portion is reserved, and the first piece 29 and the second piece 31 can be assembled together firmly.

In the present embodiment, the groove 27A is an annular-shaped a groove with the cross-sectional shape of three-sided concave, and the edge 29E of the part forming the bottom surface 29B and extending in parallel with the central axis L1 contacts the second piece 31.

With the edge 29E in contact with the second piece 31, the width W2 of the groove 27A is determined. Thus, individual variability of the dimension of the width W2 is settled within a range of dimensional tolerance, which may be caused in the specific area corresponding to the bottom surface 29B. Thus, variability, which may otherwise be caused by manual operation when the first piece 29 and the second piece 31 are assembled integrally, can be prevented from being added to the dimensional tolerance. In other words, the individual variability of the dimension of the width W2 can be prevented from being accumulated.

In the present embodiment, the first piece 29 is formed to have the first restricting section 29F, and the second piece 31 is formed to have the second restricting section 31D. Thereby, when the transfer belt 21 drifts toward the first face 29A (e.g., leftward), the first restricting section 29F contacts the shaft support 26, and the guiding member 27 is restricted from being moved leftward further. In this regard, the drifting force to drift the transfer belt 21 is not applied to the second piece 31.

Similarly, when the transfer belt drifts toward the second face 31A (e.g., rightward), the second restricting section 31D contacts the driven roller 23, and the guiding member 27 is restricted from being moved rightward further. In this regard, the drifting force to drift the transfer belt 21 is not applied to the first piece 29.

Therefore, when the transfer belt 21 drifts in either direction, the drifting force, which may otherwise affect to loosen the press-fitted assembly of the first piece 29 and the second piece 31, does not affect the guiding member 27. Thus, even when the transfer belt 21 repeatedly drifts, the first piece 29 and the second piece 31 are prevented from being disassembled.

In the present embodiment, an outer circumferential end of the first face 29A protrude outward with respect to the inner circumferential surface of the belt 21B, and the height H1 of the protrusion is greater than the sum of the thickness Ti of the belt 21D and the height H2 of the guided section 21 C. In other words, an outer diameter of the first face 29A in the first piece 29 is greater than an outer diameter of the second face 31A of the second piece 31, on which the belt strip 21B rolls.

Therefore, even when a great amount of drifting force is generated in the transfer belt 21, and when the guided section 21C is displaced out of the groove 27A, the transfer belt 21 can be prevented from being further drifted to ride over the height H1 of the first face 29A. In other words, the transfer belt 21 can be prevented from being removed from the belt unit 20.

In the present embodiment, the belt strip 21B is made of the resin in the polyamide series. While the resin in the polyamide series is easily deformable, there may be a case that the transfer belt 21 rides over the first face 29A easily. Therefore, when the belt strip 21B is made of the resin in the polyamide series, as it is in the present embodiment, it is preferable that first face 29A prevents the belt strip 21B from riding over. In particular, with the outer diameter of the first face 29A being greater than the outer diameter of the second face 31A, the first face 29A may prevent the transfer belt 21 from riding over securely, and the transfer belt 21 may be prevented from being damaged in an earlier stage. Thus, life duration of the transfer belt 21 may be improved.

In the present embodiment, the first face 29A and the second face 31A are in the forms of plain surfaces; therefore, when the widthwise end of the belt strip 21B contacts the first face 29A, or when the guided section 21C contacts the second face 31A, the transfer belt 21 including the guided section 21 C can be prevented from being damaged by the contact.

The plainness of the first face 29A and the second face 31A refers to a condition, in which the first and the second faces 29A, 31A contain substantially no visually recognizable roughness, and in which asperity of the surfaces may be, for example, Ra being 0.8 (Ra=0.8) or smaller.

More Examples

Although an example of carrying out the invention has been described, those skilled in the art will appreciate that there are numerous variations and permutations of the belt unit and the image forming apparatus that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, the guided section 21C may not necessarily be an endless strip of protrusion, which is continuously arranged on the inner peripheral surface of the belt strip 21B. For example, a toothed belt, on which smaller protrusions are intermittently arranged, may be employed.

For another example, the first face 29A may not necessarily protrude outwardly with respect to the outer circumferential surface of the belt strip 21B as long as the first face 29A protrudes outwardly with respect to the inner circumferential surface of the belt strip 21B.

For another example, the second piece 31 may not necessarily be formed to have the press-fit hole 31B, or the first piece 29 may not necessarily be formed to have the press-fit part 29C. Optionally, the first piece 29 may be formed to have a press-fit hole, and the second piece 31 may be formed to have a press-fit part 29C.

For another example, the length W1 of the part, in which the press-fit part 29C and the press-fit hole 31D contact each other along the direction in parallel with the central axis L1, may not necessarily be greater than or equal to the width W2 of the groove 27A but may be smaller than the width W2.

For another example, the first piece 29 and the second piece 31 may not necessarily be press-fitted to be assembled with each other. For example, one of the first piece 29 and the second piece 31 may be formed to have an engaging protrusion, and the other of the first piece 29 and the second piece 31 may be formed to have an engageable structure, which can be engaged with the engaging protrusion, to assemble the first piece and the second piece 31 integrally.

When the first piece 29 and the second piece 31 are assembled integrally, the first piece 29 and the second piece 31 may be fixed to respect to each other by, for example, press-fitting and screwing. Alternatively, the first piece 29 and the second piece 31 may be assembled integrally to be relatively movable with respect to each other.

For another example, the first piece 29 may not necessarily be formed to have the bearing 29D. Optionally, the second piece 31 may be formed to have the bearing, while the first piece 29 may be formed to have no bearing. Still optionally, the first piece 29 and the second piece 31 may be formed to have bearings respectively, which may be assembled to serve as the bearing 29D.

For another example, the belt strip 21B may not necessarily be made of the resin in the polyamide series but may be made of, for example, a resin in a polyimide series.

For another example, the guiding member 27 may not necessarily be rotatable independently from the driven roller 23 but may be rotatable integrally along with the driven roller 23. Alternatively, the driven roller 23 may be formed to have the groove 27A.

For another example, the guiding member 27 may not necessarily be attached to the driven roller 23 but may be attached to the driving roller 22. For another example, one or more additional rollers may be provided in addition to the driving roller 22 and the driven roller 23, and the guiding member 27 may be attached to one of those three or more rollers.

For another example, the present invention may not necessarily be applied to the direct-typed image forming apparatus but may be similarly applied to an intermediate transfer-typed image forming apparatus.

For another example, the exposure unit 9 provided to each of the photosensitive drums 7A may not necessarily be equipped with the plurality of LEDs aligned along the axial direction of the photosensitive drum 7A. The exposure unit 9 may be a so-called scanner-typed exposure unit, in which a laser beam scans the circumference of the photosensitive drum 7A along the axial direction.

For another example, the groove 27A may not necessarily be formed to have the cross-sectional shape of three-sided concave but may be formed to have a cross-sectional shape of a "V" or a trapezoid.

For another example, the first piece 29 and the second piece 31 may not necessarily be formed in the dual-parted mold patterns, or may not necessarily be unmolded along the central axis L1.

What is claimed is:

1. A belt unit, comprising:
an endless belt comprising a belt strip and a guided section, the guided section protruding from an inner circumferential surface of the belt strip at one of widthwise sides along a widthwise direction of the belt strip;
a first roller and a second roller, around which the endless belt is strained; and
a guiding member arranged on one of axial-end sides of the first roller along an axial direction of the first roller coaxially with the first roller, the guiding member being formed to have a groove, in which the guided section is set,
wherein the groove comprises a first face and a second face, which face each other along a direction in parallel with a central axis of the first roller, the first face being arranged in a position closer to the one of widthwise sides with respect to the second face along the direction in parallel with the central axis,
wherein the guiding member comprises a first piece containing the first face and a second piece containing the second face, the first piece and the second piece being separately formed and subsequently assembled to form the guiding member, and the first face protrudes outwardly with respect to the inner circumferential surface of the belt strip, and wherein the first piece is molded so as to have a parting line on an end of an axially extending and radially outmost edge of the first piece, the end of the edge being spaced from the first face.

2. The belt unit according to claim 1,
wherein the guiding member is rotatable about the central axis; and
wherein the first piece and the second piece are assembled integrally.

3. The belt unit according to claim 2, further comprising:
a bearing configured to support the guiding member rotatably on a shaft of the first roller; and
wherein the bearing is arranged in one of the first piece and the second piece.

4. The belt unit according to claim 3,
wherein the bearing is arranged in the first piece.

5. The belt unit according to claim 4,
wherein the bearing is formed to extend along a direction in parallel with the central axis from a side of the first face toward a side of the second face with an end thereof being extended beyond the second face to reach a position in vicinity of the first roller.

6. The belt unit according to claim 2,
wherein one of the first piece and the second piece is formed to have a press-fit hole, and the other one of the first piece and the second piece is formed to have a press-fit part;
wherein the press-fit part is pressed into the press-fit hole along the direction in parallel with the central axis to assemble the first piece and the second piece integrally; and
wherein a length of a part, in which the press-fit part and the press-fit hole contact each other, along the direction in parallel with the central axis is one of greater and equal to a width of the groove.

7. The belt unit according to claim 1,
wherein the groove is a circular-shaped dent and is formed to have:
the first face;
the second face; and
a bottom surface, which extends in parallel with the central axis and forms an annular surface connecting one end of the first face closer to the central axis and one end of the second face closer to the central axis;
wherein the bottom surface is integrally formed with one of the first piece and the second piece; and
wherein a tip end of a part forming the bottom surface and extending in parallel with the central axis is in contact with the other of the first piece and the second piece.

8. The belt unit according to claim 1,
wherein guiding member is movable in the axial direction; and
wherein the belt unit further comprises:
a shaft support arranged on the one of axial-end sides of the first roller along the axial direction and configured to support the first roller;
a first restricting section formed in the first piece in a position to face the shaft support and configured to restrict the guiding member from being moved toward the one of axial-end sides of the first roller; and
a second restricting section formed in the second piece in a position to face the first roller and configured to restrict the guiding member from being moved toward the other one of axial-end sides of the first roller.

9. The belt unit according to claim 1,
wherein the first face protrudes radially outwardly beyond an outer circumferential surface of the belt strip; and
wherein a dimension of protrusion of the first face beyond the outer circumferential surface of the belt strip is one of greater than and equal to a sum of a thickness of the belt strip and a height of the guided section.

10. The belt unit according to claim 1,
wherein the belt strip is made of a resin in a polyamide series.

11. The belt unit according to claim 1,
wherein the guided section is arranged in a displaced position with respect to the one of widthwise ends of the belt strip toward the other of the widthwise ends of the belt strip.

12. The belt unit according to claim 1,
wherein the guiding member is arranged solely on the one of axial-end sides of the first roller along the axial direction.

13. The belt unit according to claim 1,
wherein the first face is in a form of a circular plane.

14. The belt unit according to claim 1,
wherein the first piece and the second piece are mold-formed pieces, which are unmolded along the direction in parallel with the central axis of the guiding member.

15. The belt unit according to claim 1,
wherein the widthwise direction of the belt strip coincides with the axial direction of the first roller.

16. An image forming apparatus, comprising:
an image forming unit configured to form an image on a sheet; and
a belt unit, comprising:
an endless belt comprising a belt strip and a guided section, the guided section protruding from an inner circumferential surface of the belt strip at one of widthwise sides along a widthwise direction of the belt strip;
a first roller and a second roller, around which the endless belt is strained; and
a guiding member arranged on one of axial-end sides of the first roller along an axial direction of the first roller coaxially with the first roller, the guiding member being formed to have a groove, in which the guided section is set,
wherein the groove comprises a first face and a second face, which face each other along a direction in parallel with a central axis of the first roller, the first face being arranged in a position closer to the one of widthwise sides with respect to the second face along the direction in parallel with the central axis,
wherein the guiding member comprises a first piece containing the first face and a second piece containing the second face, the first piece and the second piece being separately molded and subsequently assembled to form the guiding member, and the first face protrudes outwardly with respect to the inner circumferential surface of the belt strip, and
wherein the first piece is molded so as to have a parting line on an end of an axially extending and radially outmost edge of the first piece, the end of the edge being spaced from the first face.

* * * * *